(12) United States Patent  
Yeom et al.

(10) Patent No.: US 11,905,997 B2
(45) Date of Patent: Feb. 20, 2024

(54) CAGE FOR BEARING

(71) Applicant: BEARINGART, Gyeongju-si (KR)

(72) Inventors: Min Cheol Yeom, Seoul (KR); Young Keun Lee, Yongin-si (KR); Woon Ju Lee, Yongin-si (KR)

(73) Assignee: BEARINGART, Gyeongju-si (KR)

( * ) Notice: Subject to any disclaimer, the term of this patent is extended or adjusted under 35 U.S.C. 154(b) by 0 days.

(21) Appl. No.: 17/193,728

(22) Filed: Mar. 5, 2021

(65) Prior Publication Data

US 2021/0190142 A1    Jun. 24, 2021

Related U.S. Application Data

(63) Continuation of application No. PCT/KR2018/010372, filed on Sep. 5, 2018.

(51) Int. Cl.
*F16C 33/66* (2006.01)
*F16C 33/46* (2006.01)
*F16C 19/36* (2006.01)

(52) U.S. Cl.
CPC .......... *F16C 33/6651* (2013.01); *F16C 19/36* (2013.01); *F16C 33/46* (2013.01); *F16C 33/4635* (2013.01)

(58) Field of Classification Search
CPC .. F16C 33/46; F16C 33/4617; F16C 33/4623; F16C 33/4629; F16C 33/4635; F16C 33/4676; F16C 33/6614; F16C 33/6651
See application file for complete search history.

(56) References Cited

U.S. PATENT DOCUMENTS

| 4,425,011 A * | 1/1984 | Cunningham ...... F16C 33/4635 |
|  |  | 384/571 |
| 9,964,151 B2 * | 5/2018 | Murata ............... F16C 33/6681 |
| 10,352,358 B2 * | 7/2019 | Kamamoto ......... F16C 33/4605 |
| 10,520,027 B2 * | 12/2019 | Kamamoto ......... F16C 33/4635 |
| 10,883,536 B2 * | 1/2021 | Matsubuchi .......... F16C 33/467 |

FOREIGN PATENT DOCUMENTS

| JP | 2005321049 A | 11/2005 |
| JP | 2007321802 A | 12/2007 |
| JP | 2008051220 A | 3/2008 |
| KR | 101454909 B1 | 11/2014 |
| KR | 1020160101882 A | 8/2016 |
| KR | 1020180137678 A | 12/2018 |

OTHER PUBLICATIONS

International Search Report of PCT/KR2018/010372 dated May 28, 2019.

* cited by examiner

*Primary Examiner* — James Pilkington
(74) *Attorney, Agent, or Firm* — Dinsmore & Shohl LLP; Yongsok Choi, Esq.

(57) ABSTRACT

A bearing cage includes a first circular ring; a second circular ring provided to be spaced apart from the first ring in a coaxial relationship with the first ring; a plurality of pillars provided in a circumferential direction of the first ring and the second ring, one end of the pillar being connected to the first ring and the other end of the pillar being connected to the second ring; a plurality of pockets provided in the circumferential direction and configured to provide a space in which a bearing roller is accommodated, the pocket being formed to be surrounded by the first ring, the pillars and the second ring; and first reservoirs provided in the pillars and comprising a first storage space for storing lubricant.

18 Claims, 13 Drawing Sheets

Radially outward direction

Radially outward direction

Radially inward direction

CAGE FOR BEARING

CROSS-REFERENCE TO RELATED APPLICATIONS

This application is a continuation of International Application No. PCT/KR2018/010372 filed on Sep. 5, 2018, the entire contents of which are herein incorporated by reference.

TECHNICAL FIELD

The present disclosure relates to a bearing cage.

BACKGROUND

A bearing is a mechanical element which serves to position a shaft of a rotating machine at a certain position and to rotate the shaft while supporting the weight of the shaft and the load applied on the shaft. When the bearing is used while being mounted to the shaft, it is necessary to reduce the frictional force between the bearing and the shaft in order to facilitate the rotation of the shaft. To do this, lubricant such as oil, grease, or the like is supplied to the bearing.

FIG. 1 is a schematic cross-sectional view of a Dual Clutch Transmission (DCT) when viewed in an axial direction. Bearings are coupled to shafts A, B, C and D of the DCT and lubricant is stored in a certain space inside the DCT. The stored lubricant may be supplied to bearings, which are coupled to the shafts A and B located at a height to which the lubricant does not reach, by churning. The shaft A corresponds to an input shaft, the shafts B and C correspond to an output shaft, and the shaft D corresponds to a differential shaft (differential gear shaft). The term "churning" refers to an operation in which elements, which are coupled to the lower shafts C and D located at a height to which the lubricant reaches, splash the lubricant upward while rotating.

During the operation of the DCT, the lubricant may also be supplied to bearings coupled to the upper shafts A and B by the churning. However, when the operation of the DCT is resumed after being left in a non-use state for a long time, the lubricant adhered to the bearings coupled to the upper shafts A and B may be completely dried. If the DCT is operated in a state in which the lubricant is completely dried (i.e., dry start), the upper shafts A and B may rotate with no lubricant, and the frictional force between the shafts and the bearings may be increased, which may cause damage to the bearings and/or the shafts.

SUMMARY

One object of the present disclosure is to provide a bearing cage that enables a bearing coupled to a mechanical device to operate with lubricant even if the mechanical device is operated again after being left in a non-use state for a long time.

In one embodiment, a bearing cage comprises: a first circular ring; a second circular ring provided to be spaced apart from the first ring in a coaxial relationship with the first ring; a plurality of pillars provided in a circumferential direction of the first ring and the second ring, one end of the pillar being connected to the first ring and the other end of the pillar being connected to the second ring; a plurality of pockets provided in the circumferential direction and configured to provide a space in which a bearing roller is accommodated, the pocket being formed to be surrounded by the first ring, the pillars and the second ring; and first reservoirs provided in the pillars and comprising a first storage space for storing lubricant.

In another embodiment, a bearing cage comprises: a first circular ring; a second circular ring provided to be spaced apart from the first ring in a coaxial relationship with the first ring; a plurality of pillars provided in a circumferential direction of the first ring and the second ring, one end of the pillar being connected to the first ring and the other end of the pillar being connected to the second ring; a plurality of pockets provided in the circumferential direction and configured to provide a space in which a bearing roller is accommodated, the pocket being formed to be surrounded by the first ring, the pillars and the second; and second reservoirs having a second storage space to be opened in a radially outward direction for storing lubricant, the second reservoir being formed to extend in a radially inward direction from an inner surface of the pillar, which is a surface facing inward of the first ring of the second ring, out of the surfaces of the pillar. The second reservoir is formed to be surrounded by: a pair of first wall portions formed to extend in the radially inward direction from the inner surface of the pillar and provided to be spaced apart with each other in the circumferential direction; a second wall portion configured to connect radially inner ends of the first wall portions; and a third wall portion formed to extend in the radially outward direction from an end of the second wall portion in a direction opposite to a first direction, which extends from the second ring toward the first ring, so as to block at least a portion of an opening formed between the first wall portions.

According to the present disclosure, lubricant that has been used during an operation of a mechanical device can be stored in a first storage space of a first reservoir provided in the bearing cage, and the lubricant can be supplied to bearing rollers even when the mechanical device is resumed after the operation is stopped for a long time.

Further, according to the present disclosure, since the bearing case comprises a first reservoir having a first storage space opened in a radially inward direction and a second reservoir having a second storage space opened in a radially outward direction, when a bearing is coupled to a mechanical device in a state that a shaft direction of the bearing is horizontal to the ground, lubricant can be stored in the first storage space of the first reservoir below the shaft and the lubricant can be stored in the second storage space of the second reservoir above the shaft. Accordingly, a sufficient amount of lubricant can be supplied to bearing rollers even when the mechanical device is reoperated after the operation is stopped for a long time.

DETAILED DESCRIPTION

Figure 1:
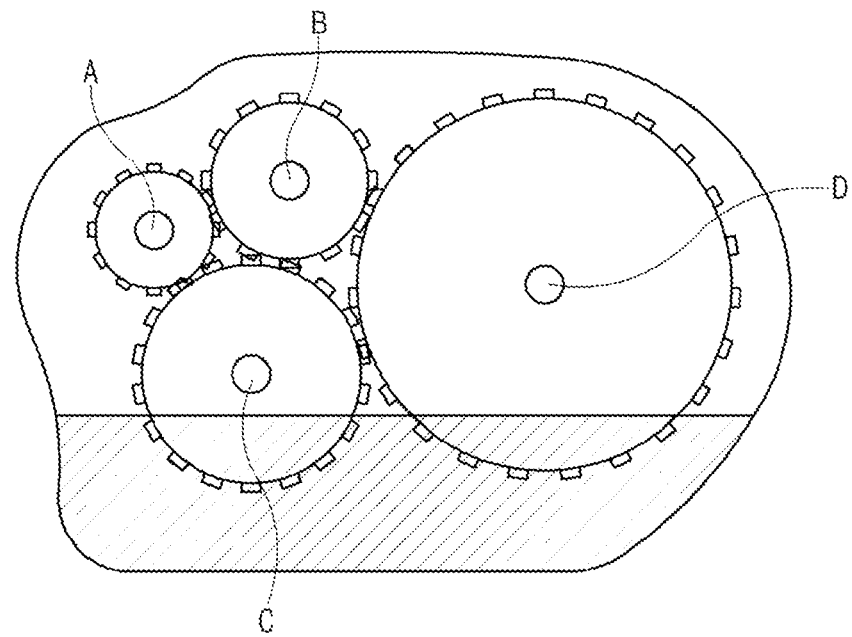
FIG. 1 is a schematic cross-sectional view of a Dual Clutch Transmission (DCT) when viewed in an axial direction.

Hereinafter, some embodiments of the present disclosure will be described in detail through exemplary drawings. It should be noted that, in adding reference numerals to components in the drawings, the same components are made to have the same symbols as possible even if they are illustrated on the other drawings. In addition, if it is determined that detailed descriptions on related known configurations or functions in describing the embodiments of the present disclosure prevent understanding of the embodiments of the present disclosure, detailed descriptions thereof will be omitted.

First Embodiment

Figure 2:
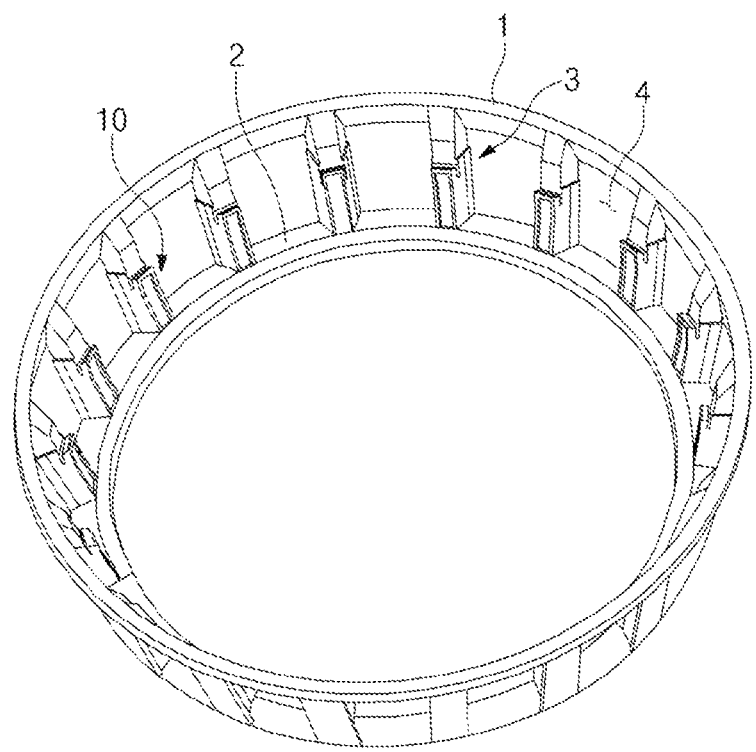
FIG. 2 is a perspective view of a bearing cage according to a first embodiment of the present disclosure.
Figure 3:
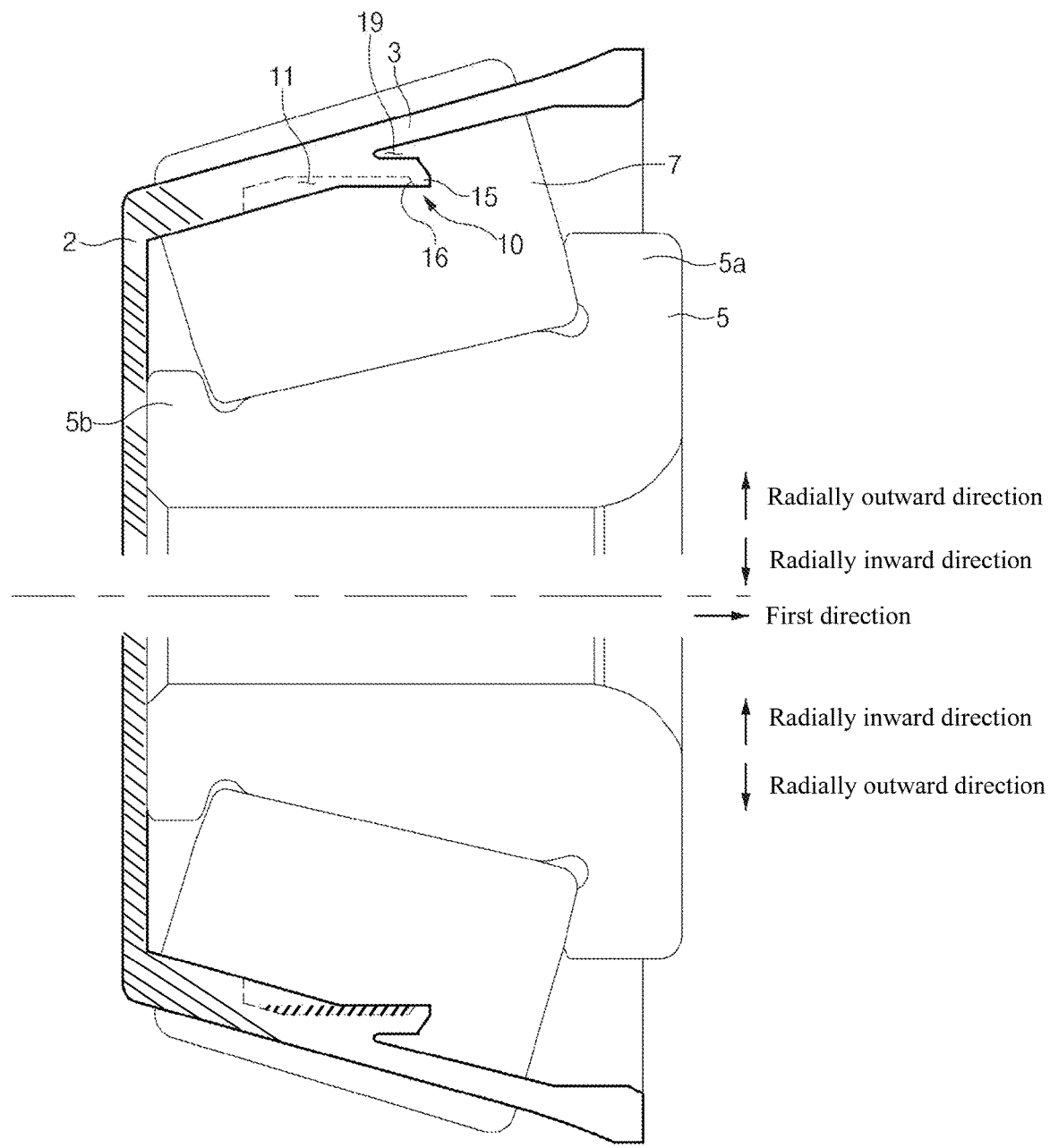
FIG. 3 is a longitudinal cross-sectional view showing a state in which rollers and an inner ring of a bearing are coupled to the bearing cage according to the first embodiment of the present disclosure.
Figure 4:
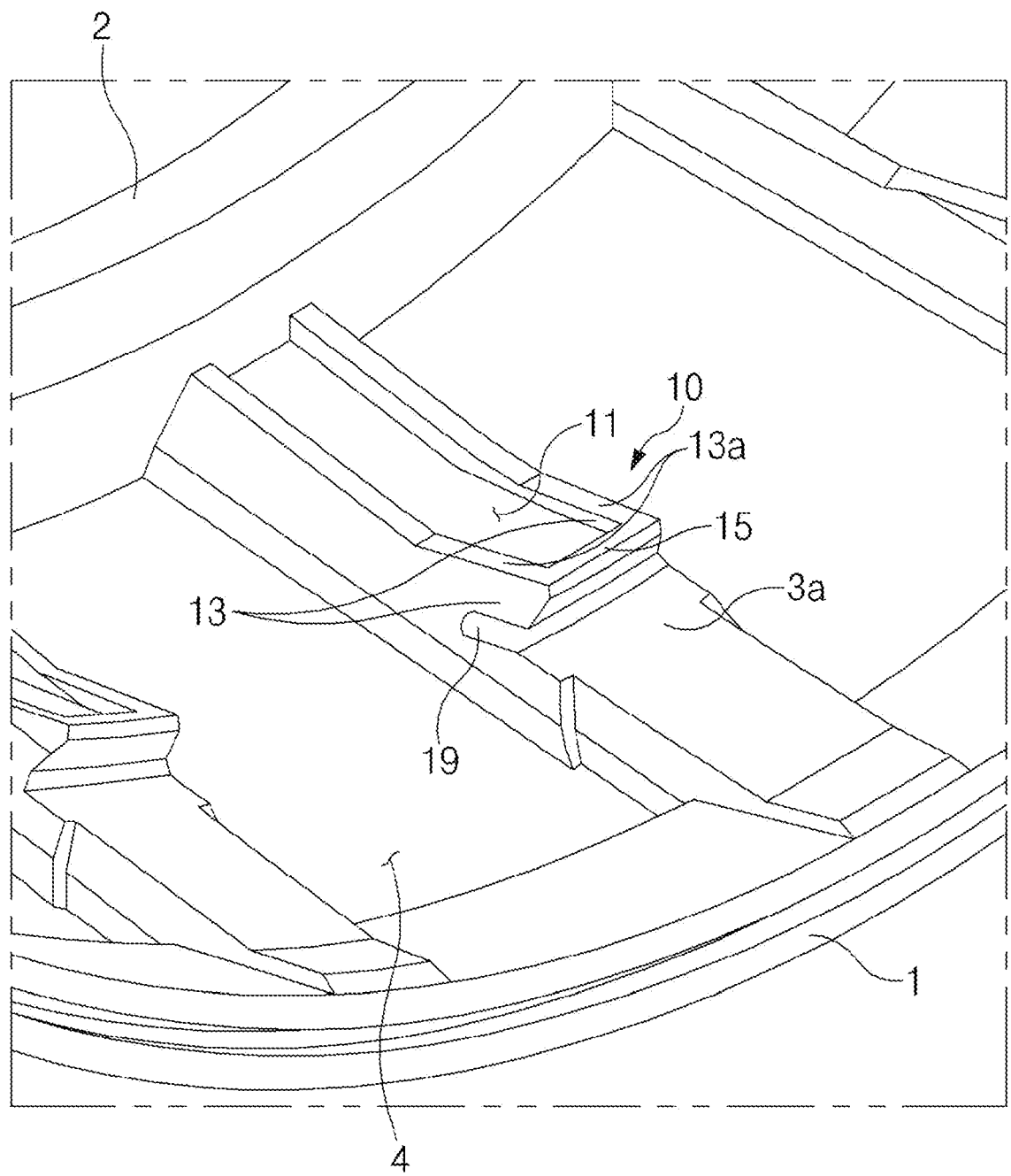
FIG. 4 is a perspective view specifically showing a first reservoir according to the first embodiment of the present disclosure.

FIG. 2 is a perspective view of a bearing cage according to a first embodiment of the present disclosure. FIG. 3 is a longitudinal cross-sectional view showing a state in which rollers and an inner ring of a bearing are coupled to the bearing cage according to the first embodiment of the present disclosure. FIG. 4 is a perspective view specifically showing a reservoir (a first reservoir) according to the first embodiment of the present disclosure. The bearing cage according to the first embodiment of the present disclosure will be described below with reference to FIGS. 2 to 4.

Referring to FIGS. 2 and 3, the bearing cage according to the first embodiment of the present disclosure comprises a first ring 1, a second ring 2, pillars 3, pockets 4 and reservoirs (first reservoirs 10).

The second ring 2 is arranged coaxially with the first ring 1, and is provided spaced apart from the first ring 1. A diameter of the second ring 2 may be smaller than that of the first ring 1. In this case, the bearing cage may be used for a tapered roller bearing.

Hereinafter, a direction extending from the second ring 2 toward the first ring 1 will be referred to as a first direction. In addition, a direction extending from a central axis of the first ring 1 and the second ring 2 toward the first ring 1 and the second ring 2 will be referred to as a radially outward direction, and a direction extending from the first ring 1 and the second ring 2 toward the central axis of the first ring 1 and the second ring 2 will be referred to as a radially inward direction (see FIG. 3).

The pillar 3 is configured such that one end thereof is connected to the first ring 1 and the other end thereof is connected to the second ring 2. A plurality of pillars 3 are provided in a spaced-apart relationship with each other along a circumferential direction of the first ring 1 and the second ring 2. The plurality of pillars 3 may be provided to be spaced at equal intervals.

The first ring 1, the second ring 2 and a pair of pillars 3 form a pocket 4. That is, the pocket 4 is formed to be surrounded by the first ring 1, the pillars 3 and the second ring 2, and a plurality of pockets 4 are provided along the circumferential direction. The pocket 4 provides a space in which a roller of the bearing is accommodated. The pillar 3 may function as a partition between one pocket 4 and another pocket 4 adjacent thereto, and may serve to prevent rollers accommodated in adjacent pockets 4 from coming into contact with each other.

The first reservoir 10 is provided in the pillar 3, and has a storage space (a first storage space 11 for storing lubricant. When the operation of a mechanical device to which the bearing is coupled is stopped, the used lubricant may be stored in the first storage space 11. When the mechanical device is reoperated, the lubricant stored in the first storage space 11 may be supplied to the roller by virtue of a centrifugal force caused by the rotation of a shaft.

That is, when the operation of the mechanical device is resumed in a state in which the mechanical device is left in a non-use state for a long time, the lubricant adhered to the rollers and the bearing cage may be completely dried, and consequently the rotation of the shaft may begin with no lubricant (i.e., dry start). In this case, the frictional force between the rollers and the shaft is increased, which may cause damage to the bearing and the shaft.

In particular, in the case of the tapered roller bearing in which the diameter of the second ring 2 is smaller than the diameter of the first ring 1, the used lubricant may flow downward along inclined surfaces of the pillars 3. In the bearing cage of the present disclosure, the used lubricant may be stored in the first reservoir 10, which prevents the mechanical device from operating with no lubricant.

Hereinafter, the first reservoir 10 will be described in more detail with reference to FIG. 4. The first storage space 11 may be provided on an inner surface 3a, which faces inward of the first ring 1 or the second ring 2, out of surfaces of the pillar 3. The first storage space 11 may be formed to be open in the radially inward direction.

For example, the first storage space 11 may be formed to be recessed in the radially outward direction from the inner surface 3a. Alternatively, the first storage space 11 may be formed to be surrounded by wall portions extending in the radially inward direction from the inner surface 3a. That is, the first reservoir 10 may further comprise: a pair of first wall portions 13 formed to extend in the radially inward direction and provided to be spaced apart from each other along the circumferential direction; and a second wall portion 15 formed to extend in the radially inward direction from the inner surface 3a and configured to connect the first wall portions 13. The first wall portions 13 and the second wall portion 15 may form the first storage space 11 therein. Alternatively, the first storage space 11 formed by the first wall portions 13 and the second wall portion 15 may be formed to be further recessed in the radially outward direction.

In this case, as illustrated in FIG. 4, one ends of the first wall portions 13 may be coupled to the second ring 2, and the second wall portion 15 may connect the other ends (the first direction ends) of the first wall portions 13. Alternatively, when the first wall portions 13 are not coupled to the second ring 2, the second wall portion 15 may be provided both at end portions in the first direction and at end portions in the opposite direction to the first direction.

Further, even in the case where the diameter of the second ring 2 is set to be smaller than the diameter of the first ring 1, the second wall portion 15 may be provided so as to connect the first direction ends of the first wall portions 13. That is, in the case where the diameter of the second ring 2 is set to be smaller than the diameter of the first ring 1, the pillar 3 is formed to be inclined in the radially outward direction as it goes from the second ring 2 toward the first ring 1. Thus, even if the second wall portion 15 is formed only at the first direction end, the first storage space 11 may be formed by the inclination of the pillar 3.

Figure 5A:
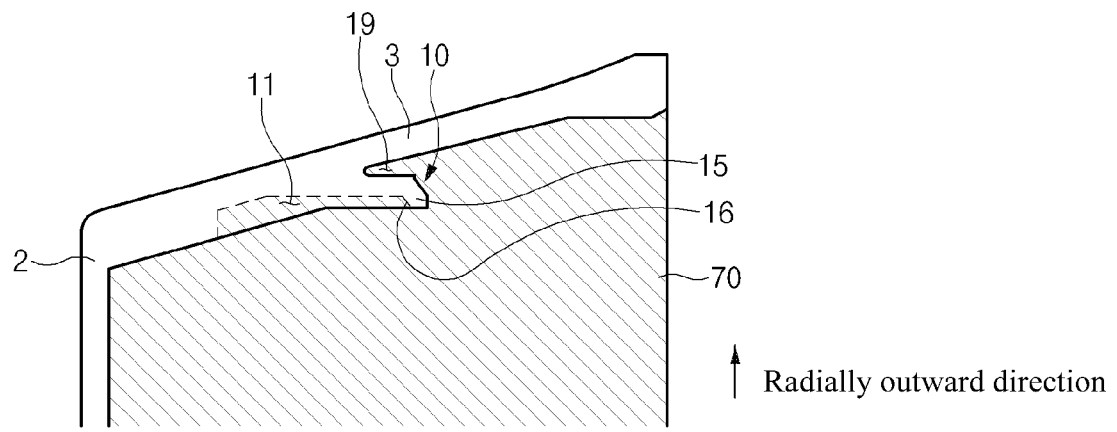
FIG. 5A is a longitudinal cross-sectional view schematically illustrating a process of injection-molding the first reverser according to the first embodiment of the present disclosure.

In the meantime, the bearing cage according to the first embodiment of the present disclosure may be formed of a plastic material. In this case, the bearing cage may generally be manufactured by injection-molding. FIG. 5 is a longitudinal cross-sectional view schematically illustrating a process of injection-molding the first reservoir according to the first embodiment of the present disclosure.

Since, the first storage space 11 is provided to be recessed in the radially outward direction relative to the second wall portion 15, when separating a mold 70 which has been inserted to form the first storage space 11 from the bearing case, the mold 70 may not be separated because it is locked to the second wall portion 15.

To address this, the second wall portion 15 may comprise a inclined surface 16 formed to extend from the bottom surface of the first storage space 11 and configured to gradually increase a thickness in the radially inward direction as it goes in the first direction. The inclined surface 16 is an inclined surface formed to extend from the bottom surface of the first storage space 11 and configured to be moved in the radially inward direction as it goes in the first direction.

Further, the first wall portion 13 may comprise a inclined surface 13a. The inclined surface 13a may be formed to extend from a position spaced apart from the second wall portion 15 by a certain distance in a direction opposite to the first direction (see FIG. 4). The inclined surface 13a may be formed such that a thickness in the radially inward direction is increased as it goes in the first direction (see FIG. 4). That is, the inclined surface 13a is an inclined surface configured to be moved in the radially inward direction as it goes in the first direction.

Figure 5B:
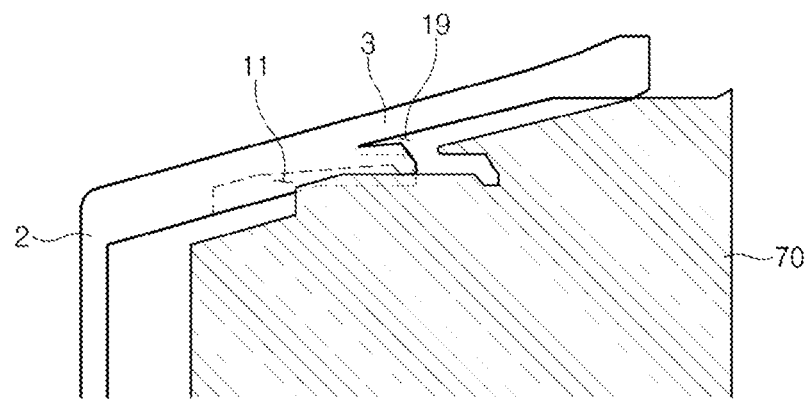
FIG. 5B is a longitudinal cross-sectional view schematically illustrating a process of injection-molding the first reverser according to the first embodiment of the present disclosure.
Figure 5C:
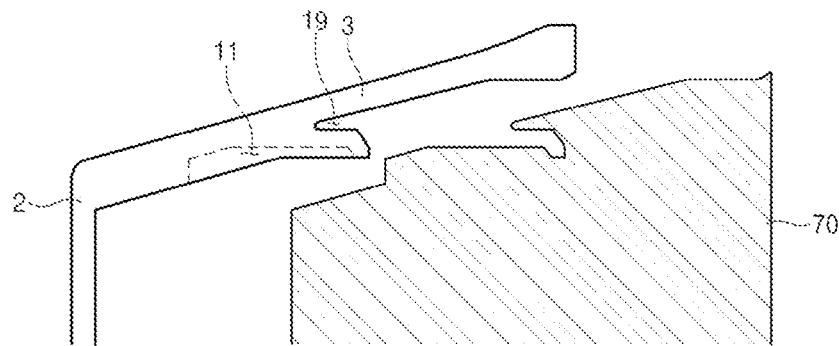
FIG. 5C is a longitudinal cross-sectional view schematically illustrating a process of injection-molding the first reverser according to the first embodiment of the present disclosure.

The inserted mold 70 may press the inclined surface 13a and the inclined surface 16 when being separated from the bearing cage, so that the first reservoir 10 is elastically deformed in the radially outward direction and thus the inserted mold 70 can be easily separated from the bearing cage (see FIG. 5B).

In this case, the bearing cage may further comprise a first displacement space 19 to form a space in which the first reservoir 10 is elastically displaced in radially outward direction. The first displacement space 19 may be formed at the rear side of the first reservoir 10 in the direction opposite to the first direction between the second wall portion 15 and the inner surface 3a of the pillar 3. When the mold 70 is separated from the bearing cage, the first wall portions 13 and the second wall portion 15 may be elastically displaced to the first displacement space 19 so that the mold 70 can be easily separated. As described above, since the bearing cage according to the first embodiment of the present disclosure comprises the inclined surface 13a, the inclined surface 16, the first displacement space 19, or the like, the bearing cage according to the first embodiment of the present disclosure can be produced in a simplified manner through a conventional mold.

Second Embodiment

Figure 6:
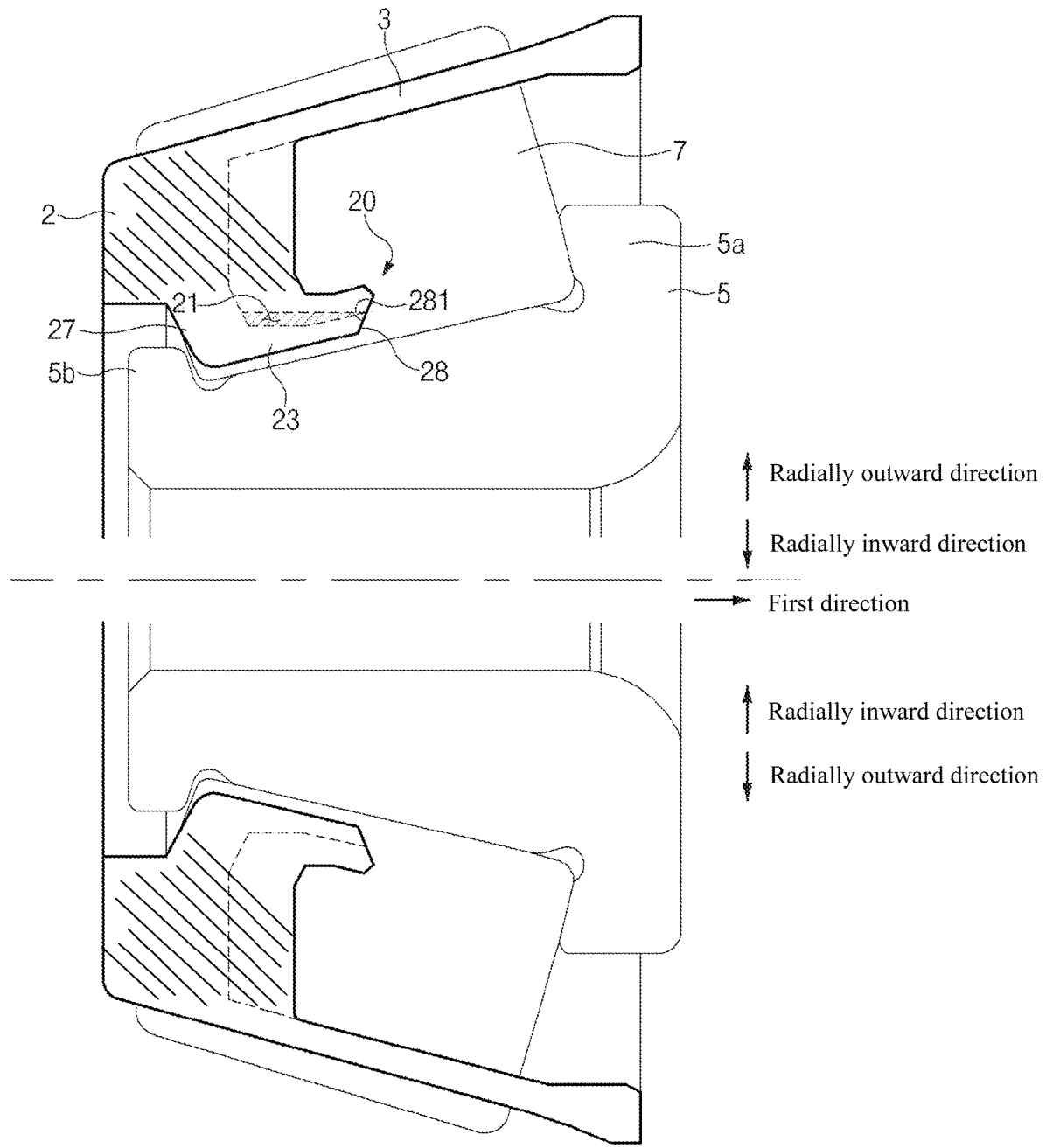
FIG. 6 is a longitudinal cross-sectional view showing a state in which rollers and an inner ring of a bearing are coupled to a bearing cage according to a second embodiment of the present disclosure.
Figure 7:
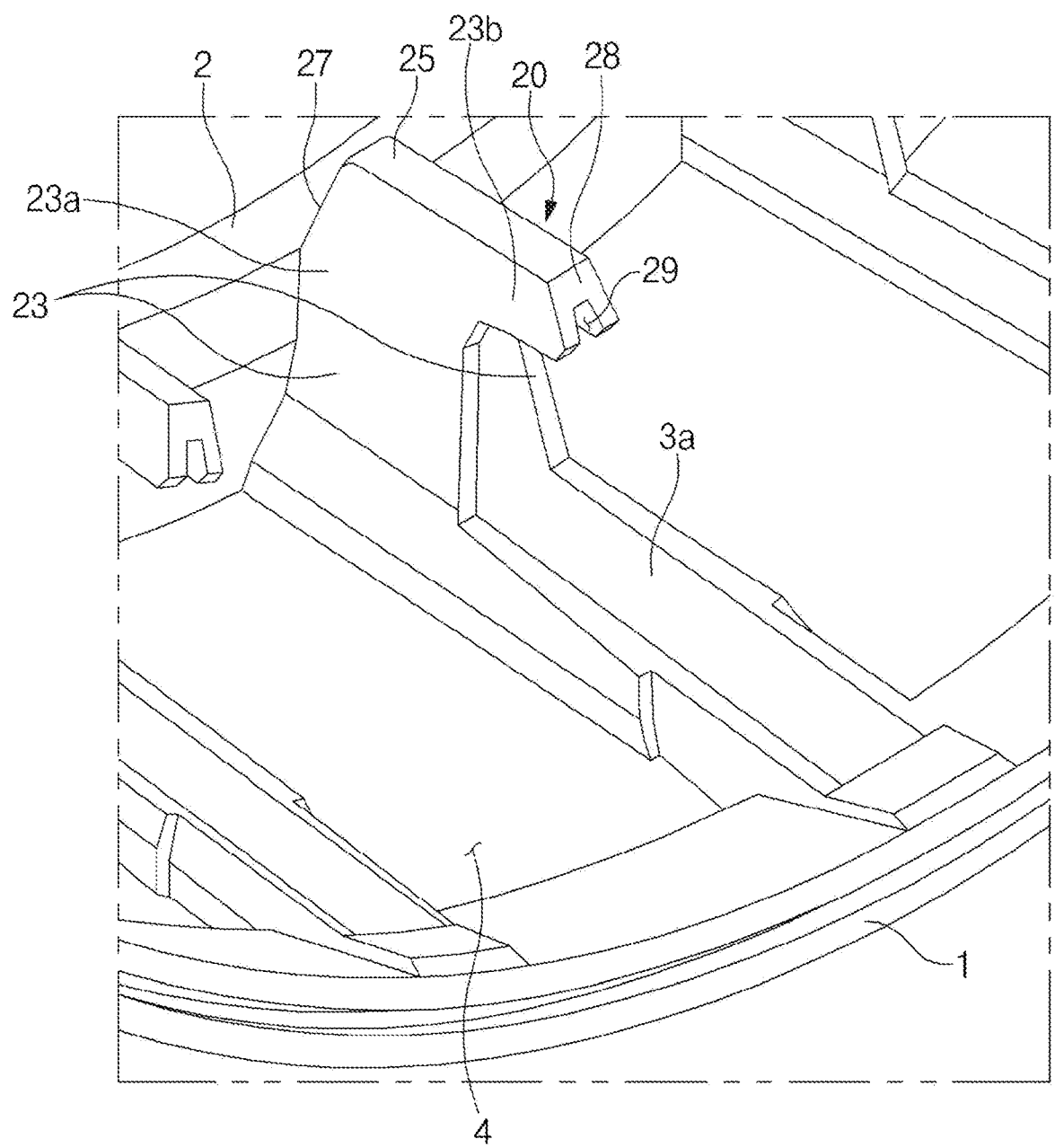
FIG. 7 is a perspective view specifically illustrating a second reservoir according to the second embodiment of the present disclosure.

FIG. 6 is a longitudinal cross-sectional view showing a state in which rollers and an inner ring of a bearing are coupled to a bearing cage according to a second embodiment of the present disclosure. FIG. 7 is a perspective view specifically illustrating a reservoir (a second reservoir) according to the second embodiment of the present disclosure. The bearing cage according to the second embodiment of the present disclosure will be described with reference to FIGS. 6 and 7. The bearing cage according to the second embodiment of the present disclosure is different from the bearing cage according to the first embodiment in that the second reservoir is provided instead of the first reservoir.

The bearing cage according to the second embodiment of the present disclosure comprises reservoirs (second reservoirs 20) formed to extend in the radially inward direction from the pillar 3. The second reservoir 20 may comprise a storage space (a second storage space 21) formed to be open in the radially outward direction for storing lubricant.

As illustrated in FIG. 6, in a case in which the bearing is coupled to the mechanical device such that the axial direction of the bearing is arranged to be horizontal to the ground, when the operation of the mechanical device is stopped, the lubricant may be stored in the second storage space 21 located above the shaft, and when the operation of the mechanical device is resumed, the lubricant stored in the second storage space 21 may be supplied to the roller by virtue of a centrifugal force caused by the rotation of the shaft. Thus, even if the operation of the mechanical device is resumed after the mechanical device is left in a non-use state for a long time, it possible to prevent the mechanical device from operating with no lubricant by the lubricant stored in the second reservoir 20.

Referring to FIG. 7, the second reservoir 20 may further comprise: first wall portions 23; a second wall portion 25; and a third wall portion 27. The second storage space 21 may be formed to be surrounded by the first wall portions 23, the second wall portion 25 and the third wall portion 27. The second reservoir 20 may further comprise a fourth wall portion 28, and the second storage space 21 may be further surrounded by the fourth wall portion 28.

First, a pair of first wall portions 23 may be formed to extend in the radially inward direction from the inner surface 3a of the pillar 3 while being spaced apart from each other along the circumferential direction. Further, the first wall portions 23 may comprise a first extended portion 23a formed to extend in the radially inward direction from an end of the inner surface 3a in the direction opposite to the first direction; and a second extended portion 23b formed to extend in the first direction from a radially inward end of the first extended portion 23a. That is, the first wall portions 23 may be formed in an L shape.

Next, the second wall portion 25 may connect the radially inward ends of the first wall portions 23 with each other. The third wall portion 27 may extend in the radially outward direction from an end of the second wall portion 25 in the direction opposite to the first direction so as to block at least a portion of an opening formed between the first wall portions 23.

The fourth wall portion 28 may extend in the radially outward direction from a first direction end of the second wall portion 25 so as to block at least a portion of an opening formed between the first wall portions 23. The fourth wall portion 28 may be formed lower than the first wall portions 23 with reference to the second wall portion 25. That is, both the fourth wall portion 28 and the first wall portions 23 extend in the radially outward direction from the second wall portion 25, but the radially outward end of the fourth wall portion 28 is positioned adjacent to the second wall portion 25 relative to the radially outward end of the first wall portion 23.

An opening 29 is formed in the fourth wall portion 28, so that the lubricant stored in the second storage space 21 can be easily discharged to the roller 7 (see FIG. 7).

Figure 8A:
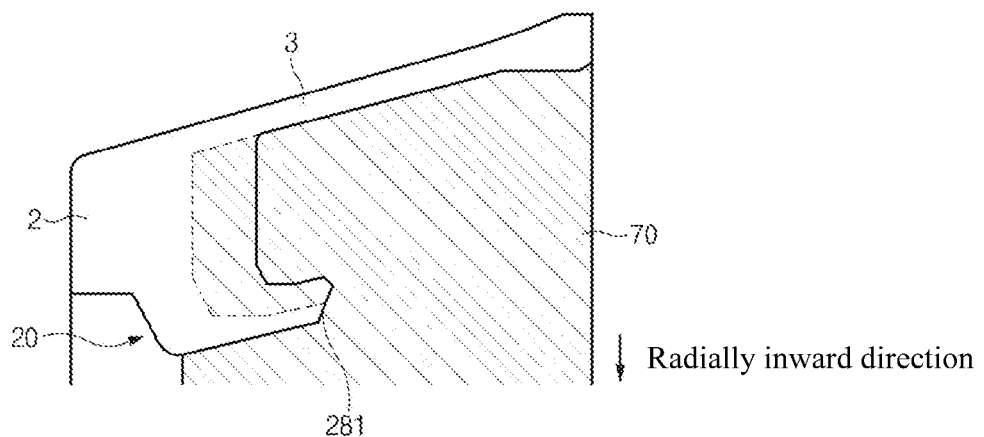
FIG. 8A is a longitudinal cross-sectional view schematically illustrating a process of injection-molding the second reservoir according to the second embodiment of the present disclosure.

In the meantime, the bearing cage according to the second embodiment of the present disclosure may also be formed of a plastic material. In this case, the bearing cage may generally be manufactured through a mold. FIG. 8 is a longitudinal cross-sectional view schematically illustrating a process of injection-molding the second reservoir according to the second embodiment of the present disclosure.

Since the second storage space 21 is provided to be recessed more radially inwardly than the fourth wall portion 28, when the mold 70 inserted to form the second storage space 21 is separated from the bearing cage, the mold 70 may not be separated because it is locked to the fourth wall portion 28.

To address this, the fourth wall portion 28 may comprise a inclined surface 281. The inclined surface 281 may be formed to extend from the bottom surface of the second storage space 21. Further, The inclined surface 281 may be formed to gradually increase a thickness in the radially outward direction as it goes in the first direction. That is, the inclined surface 281 is a inclined surface configured to be moved in the radially outward direction as it goes in the first direction.

Figure 8B:
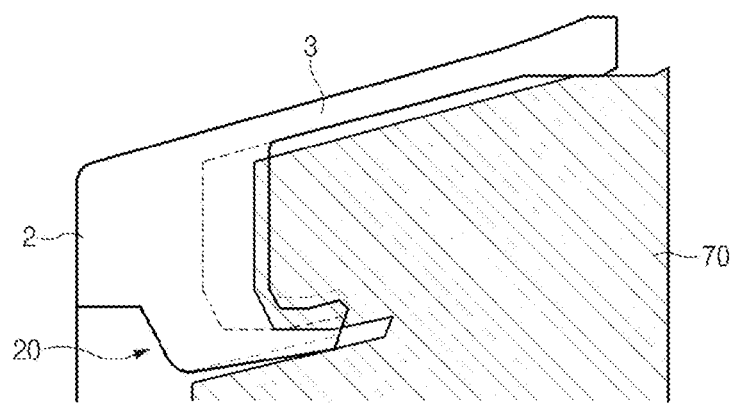
FIG. 8B is a longitudinal cross-sectional view schematically illustrating a process of injection-molding the second reservoir according to the second embodiment of the present disclosure.
Figure 8C:
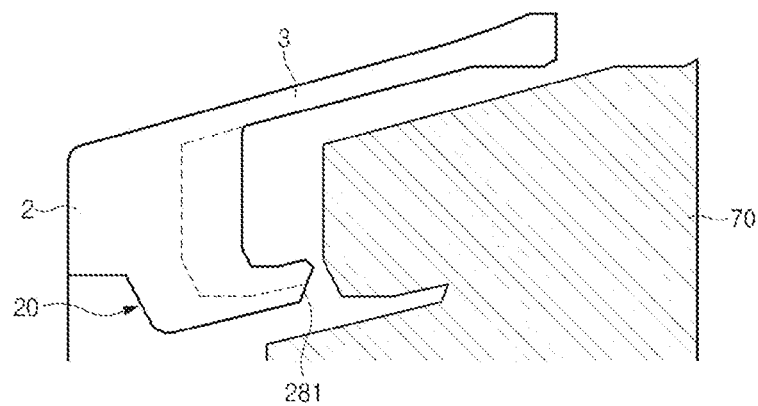
FIG. 8C is a longitudinal cross-sectional view schematically illustrating a process of injection-molding the second reservoir according to the second embodiment of the present disclosure.

When the inserted mold 70 is separated from the bearing cage, the mold 70 may press the inclined surface 281 so that the second reservoir 20 is elastically deformed in the radially inward direction and thus the mold 70 can be easily separated from the bearing cage (see FIG. 8B). As described above, since the bearing cage according to the second embodiment of the present disclosure comprises the inclined surface 281, the bearing cage according to the second embodiment of the present disclosure can be produced in a simplified manner through a conventional mold.

Third Embodiment

Figure 9:
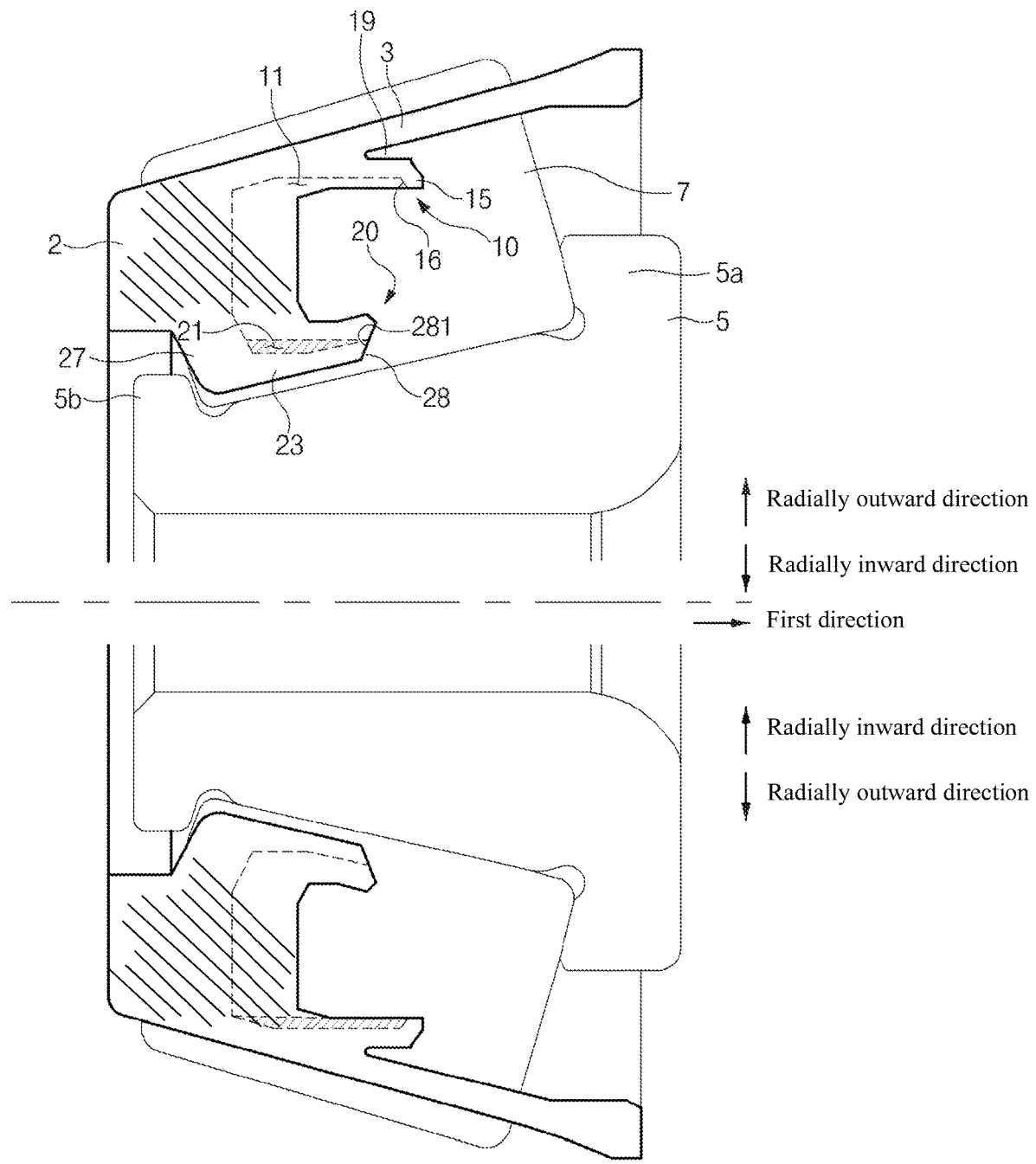
FIG. 9 is a longitudinal cross-sectional view showing a state in which rollers and an inner ring of a bearing are coupled to a bearing cage according to a third embodiment of the present disclosure.
Figure 10:
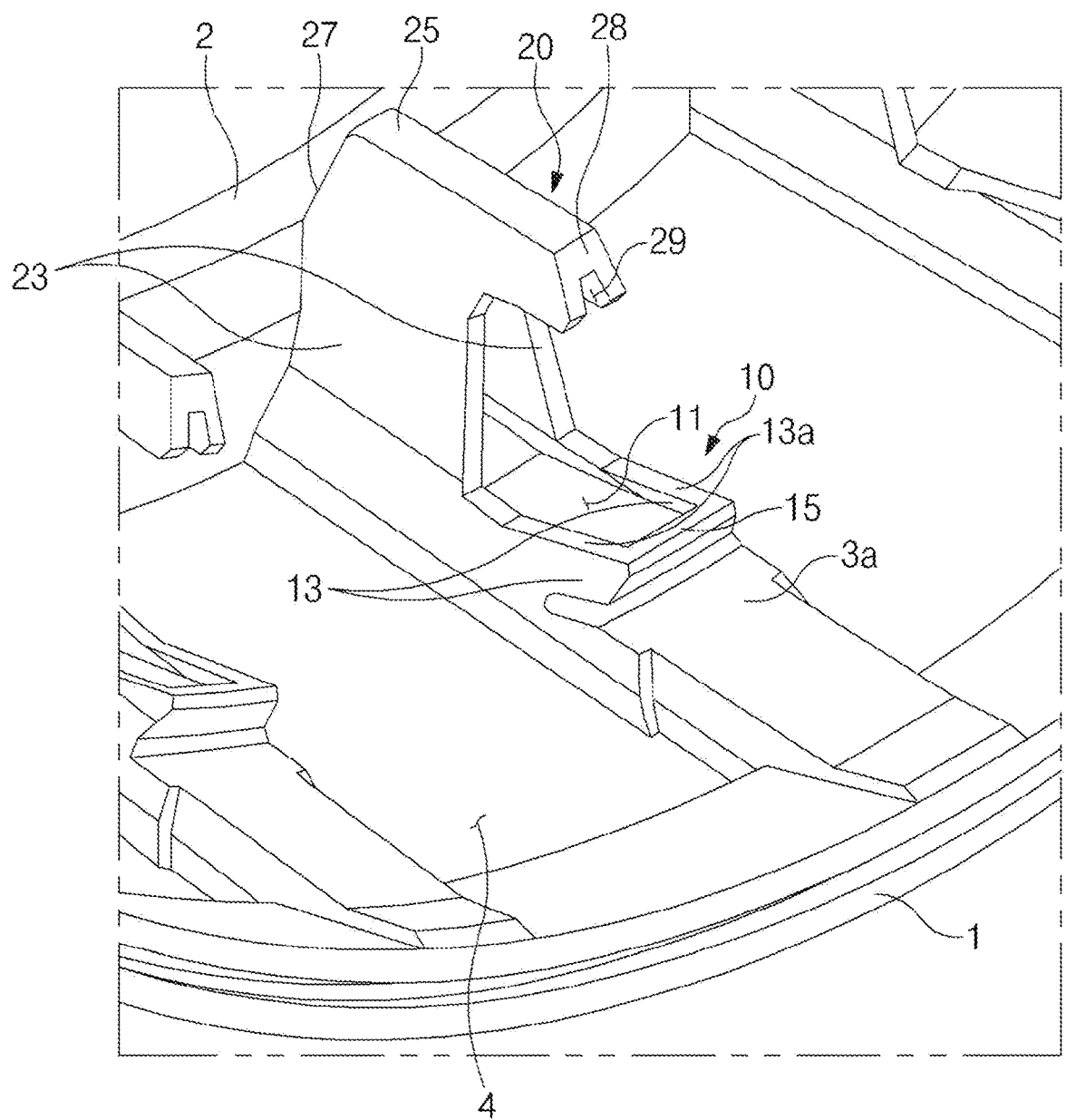
FIG. 10 is a perspective view specifically showing a first reservoir and a second reservoir according to the third embodiment of the present disclosure.

FIG. 9 is a longitudinal cross-sectional view showing a state in which rollers and an inner ring for a bearing are coupled to a bearing cage according to a third embodiment of the present disclosure. FIG. 10 is a perspective view specifically showing a first reservoir and a second reservoir according to the third embodiment of the present disclosure. The bearing cage according to the third embodiment of the present disclosure will be described below with reference to FIGS. 9 and 10.

As illustrated in FIGS. 9 and 10, the bearing cage according to the third embodiment of the present disclosure may comprise both the first reservoir 10 of the first embodiment and the second reservoir 20 of the second embodiment. In this case, the first wall portion 23 of the second reservoir 20 may be formed to extend in the radially inward direction from the first wall portion 13 of the first reservoir 10.

In the present embodiment, the bearing cage comprises both the first reservoir 10 provided with the first storage space 11 opened in the radially inward direction and the second reservoir 20 provided with the second storage space 21 opened in the radially outward direction. Thus, in a case in which the bearing is coupled to the mechanical device such that the axial direction of the bearing is horizontal to the ground, the lubricant may be stored in the first storage space 11 of the first reservoir 10 below the shaft and may be stored in the second storage space 21 of the second reservoir 20 above the shaft, as illustrated in FIG. 9. Therefore, even if the operation of the mechanical device is resumed after the mechanical device is left in a non-use state for a long time, a sufficient amount of lubricant may be supplied to the roller 7 for the bearing.

Figure 11A:
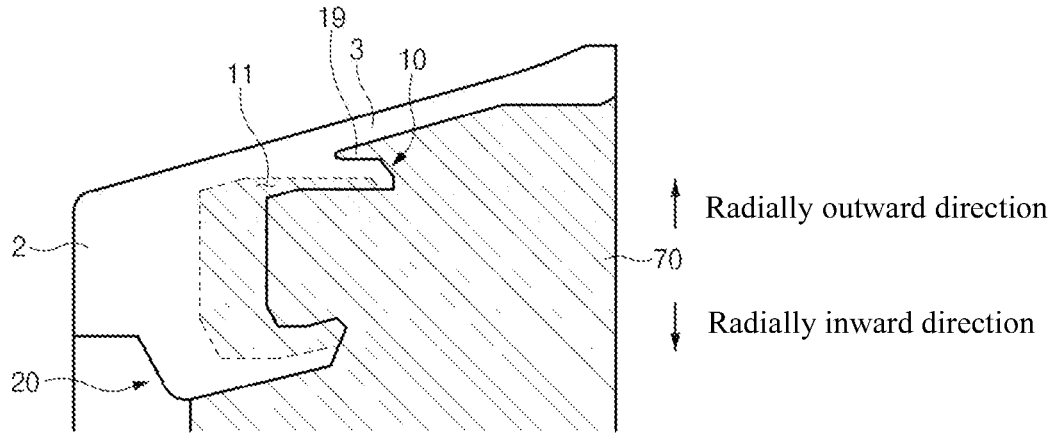
FIG. 11A is a longitudinal cross-sectional view schematically illustrating a process of injection-molding the first reservoir and the second reservoir according to the third embodiment of the present disclosure.
Figure 11B:
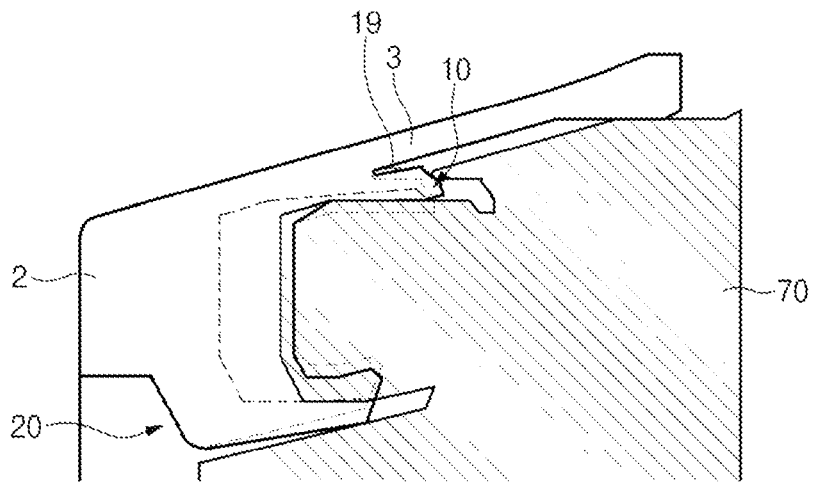
FIG. 11B is a longitudinal cross-sectional view schematically illustrating a process of injection-molding the first reservoir and the second reservoir according to the third embodiment of the present disclosure.
Figure 11C:
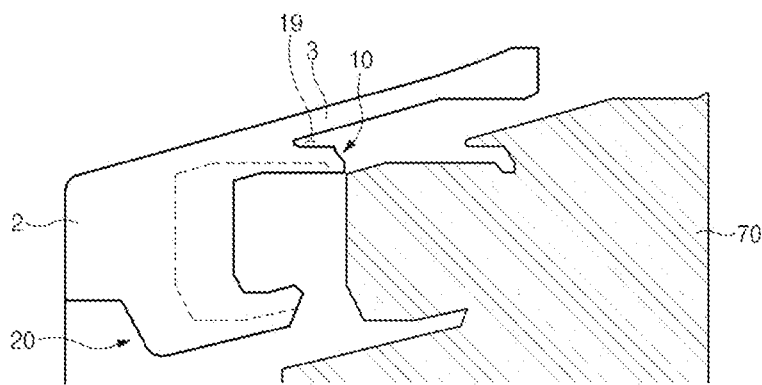
FIG. 11C is a longitudinal cross-sectional view schematically illustrating a process of injection-molding the first reservoir and the second reservoir according to the third embodiment of the present disclosure.

FIG. 11 is a longitudinal cross-sectional view schematically illustrating a process of injection-molding the first reservoir and the second reservoir according to the third embodiment of the present disclosure. The first reservoir 10 according to the third embodiment of the present disclosure may also comprise the inclined surfaces 13a, the inclined surfaces 16 and the first displacement space 19. The second reservoir 20 according to the third embodiment of the present disclosure may also comprise the inclined surfaces 281. Accordingly, when the mold 70 is separated from the bearing cage, the first reservoir 10 may be elastically displaced in the radially outward direction, and the second reservoir 20 may be elastically displaced in the radially inward direction. As a result, the mold 70 can be easily separated from the bearing cage (see FIG. 11B).

Figure 13:
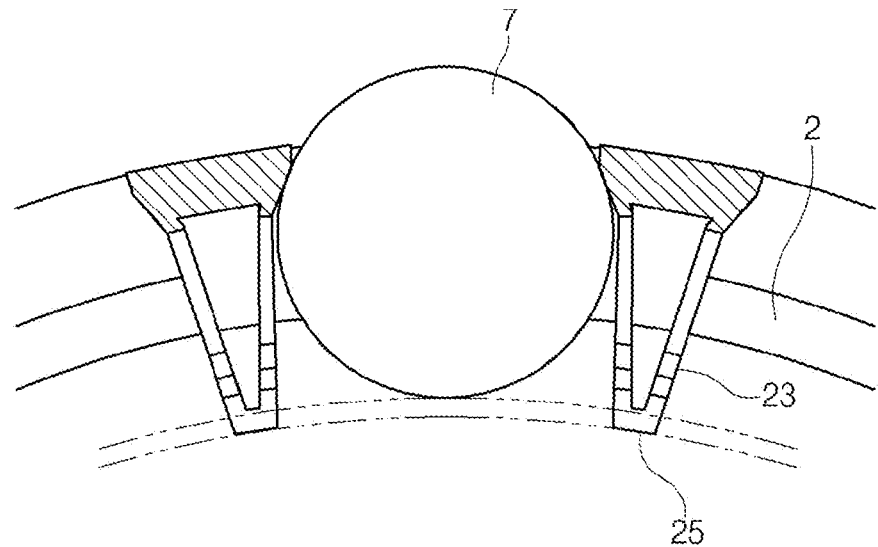
FIG. 13 is a plan view showing a state in which the roller of the bearing is accommodated in the bearing cage according to the third embodiment of the present disclosure.
Figure 14:
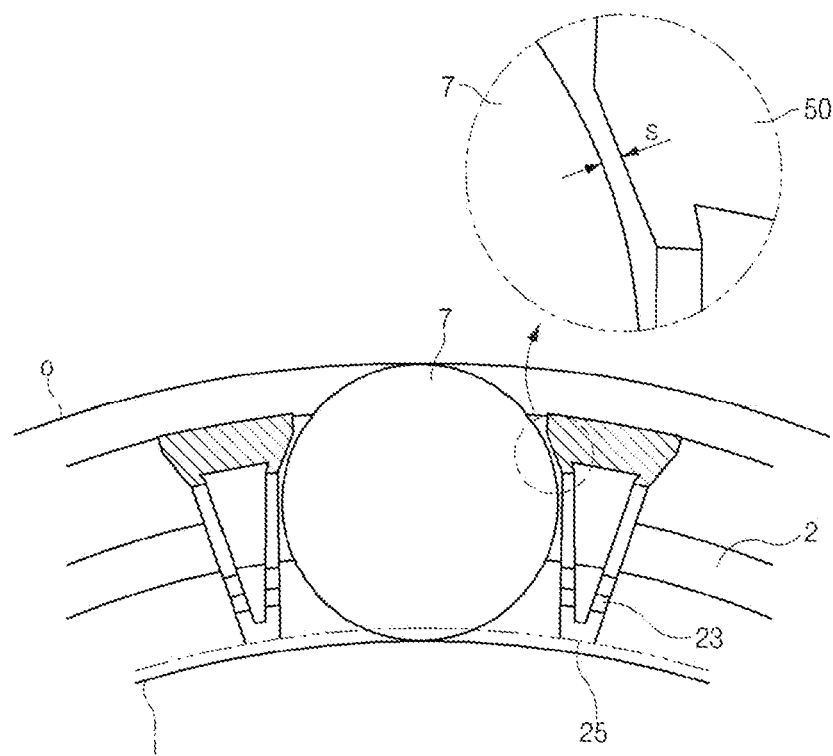
FIG. 14 is a plan view showing a state in which the roller, the inner ring and an outer ring of the bearing are assembled to the bearing cage according to the third embodiment of the present disclosure.

FIG. 12 is a longitudinal cross-sectional view schematically showing a process of assembling the inner ring in the bearing cage according to the third embodiment of the present disclosure. FIG. 13 is a plan view showing a state in which the roller for the bearing is accommodated in the bearing cage according to the third embodiment of the present disclosure. FIG. 14 is a plan view showing a state in which the roller, the inner ring and an outer ring of the bearing are assembled to the bearing cage according to the third embodiment of the present disclosure. A process of assembling the inner ring and the outer ring in the bearing cage according to the third embodiment of the present disclosure will be described below with reference to FIGS. 12 to 14. Hereinafter, descriptions will be mainly made on the bearing cage according to the third embodiment of the present disclosure, however configurations to be described below may be similarly applied to the bearing cage according to the first embodiment or the second embodiment of the present disclosure.

Figure 12A:
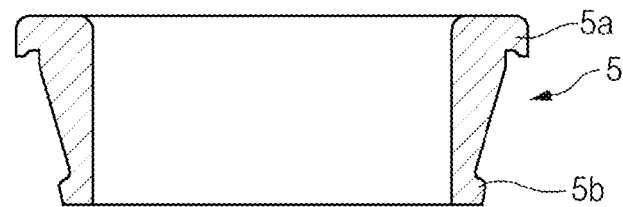
FIG. 12A is a longitudinal cross-sectional view schematically showing a process of assembling the inner ring in the bearing cage according to the third embodiment of the present disclosure.
Figure 12B:
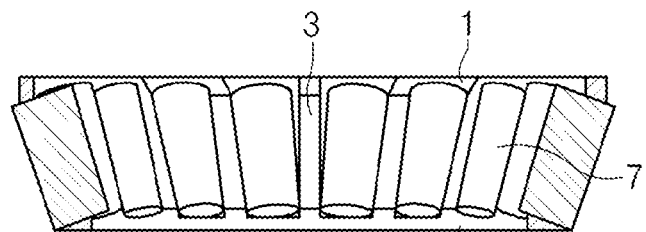
FIG. 12B is a longitudinal cross-sectional view schematically showing a process of assembling the inner ring in the bearing cage according to the third embodiment of the present disclosure.
Figure 12C:
FIG. 12C is a longitudinal cross-sectional view schematically showing a process of assembling the inner ring in the bearing cage according to the third embodiment of the present disclosure.

First, a bearing cage where rollers 7 are accommodated into a pocket and an inner ring 5 to be assembled to the bearing cage are prepared, as illustrated in FIG. 12A. Then, as illustrated in FIGS. 12A to 12C, the inner ring 5 of the bearing may be assembled inside the first ring 1 and the second ring 2 in a second direction extending from the first ring 1 toward the second ring 2. More specifically, FIG. 12B shows a state in which a lower flange 5b of the inner ring 5 is in contact with the second wall portion 25 of the second reservoir 20 in the process of assembling the inner ring 5 in the bearing cage, and FIG. 12C shows a state in which the inner ring 5 is coupled to the bearing cage. The upper portion 5a of the inner ring 5 is in contact with the rollers 7.

As illustrated in FIGS. 13 and 14, the first wall portions 23 of the second reservoir 20 may be provided so as to extend in the radially inward direction from the inner surface of the pillar such that the second wall portion 25 of the second reservoir 20 protrudes more radially inwardly than the second ring 2. Further, as illustrated in FIG. 13, the first wall portions (23) of the second reservoir 20 may be provided so as to extend in the radially inward direction from the inner surface such that the second wall portion 25 of the second reservoir 20 protrudes more radially inwardly than the roller 7 when the roller 7 is accommodated in the pocket (24). Thus, as illustrated in FIG. 12B, when the inner ring 5 is assembled to the bearing cage, the lower flange 5b of the inner ring 5 may not be brought into contact with the roller 7 and may be brought into contact with the second wall portion 25 of the second reservoir 20. When the inner ring 5 continues to move in the second direction after the inner ring 5 is in contact with the second wall portion 25 of the second reservoir 20, the inner ring 5 may press the second wall portion 25 of the second reservoir 20 to elastically deform the second wall portion 25 of the second reservoir 20 in the radially outward direction, and then may be completely assembled to the bearing cage as illustrated in FIG. 12C.

In this case, the first ring 1 and the second ring 2 may formed of a material such as plastic to be elastically deformable. The second wall portion 25 of the second reservoir 20 may be configured to be inclined in the radially outward direction along the direction extending from the first ring 1 toward the second ring 2, so that the second wall portion 25 of the second reservoir 20 can be easily pressed in the radially outward direction by the inner ring 5 being assembled.

As described above, in the course of assembling the inner ring 5 to the bearing cage, the inner ring 5 is coupled to the bearing cage in the state in which the lower flange 5b of the inner ring 5 presses the second wall portions 25 of the second reservoir 20 without coming into contact with the roller 7. This makes it possible to prevent the roller 7 from being damaged by the inner ring 5 in the course of assembling the inner ring 5 to the bearing cage.

Figure 12D:
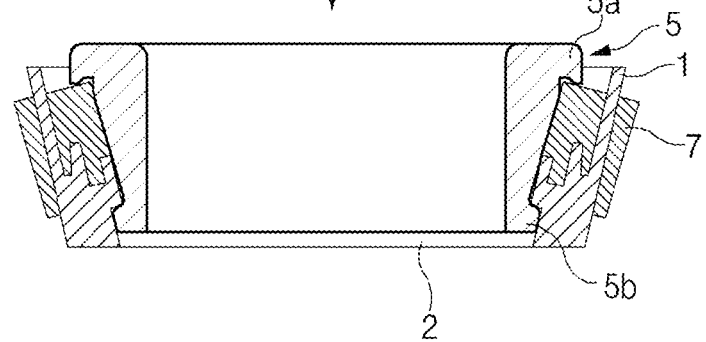
FIG. 12D is a longitudinal cross-sectional view schematically showing a process of assembling the inner ring in the bearing cage according to the third embodiment of the present disclosure.

After the inner ring 5 is assembled to the bearing cage as illustrated in FIG. 12C, the outer ring is assembled as illustrated in FIGS. 12D and 14. Although, the outer ring is not illustrated in FIGS. 12D and 14, FIG. 12D shows a state in which the outer ring is coupled to the bearing cage in the direction extending from the second ring toward the first ring. In FIG. 14, a symbol "o" denotes a raceway formed by an inner peripheral surface of the outer ring.

In this case, the pocket may have a size to form a clearance s between the pocket and the roller 7 as illustrated in FIG. 14, so that the roller accommodated in the pocket can be displaced in the radially inward direction by the assembly of the outer ring. That is, when the outer ring is coupled to the bearing cage, the roller 7 is pressed in the radially inward direction. After the assembling of the outer ring is completed, the roller 7 protrudes more radially inwardly than the second wall portion 25 of the second reservoir 20, so that a raceway i in which the roller 7 and the inner ring are in contact with each other may be formed at the radially inward position more than the second wall portion 25 of the second reservoir 20.

Fourth Embodiment

Figure 15:
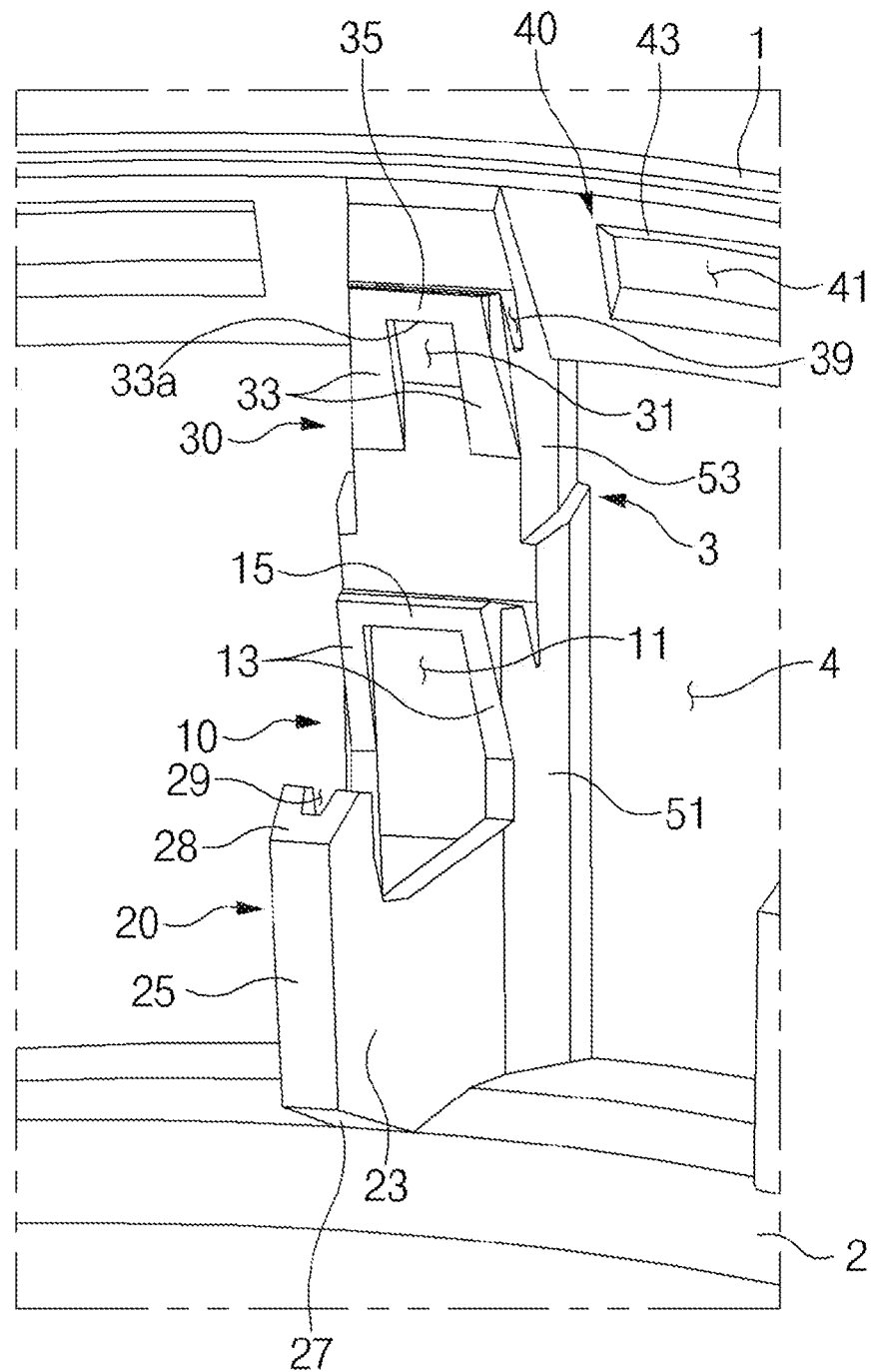
FIG. 15 is a perspective view specifically illustrating a pillar according to a fourth embodiment of the present disclosure.

FIG. 15 is a perspective view specifically illustrating a pillar according to a fourth embodiment of the present disclosure. A bearing cage according to the fourth embodiment of the present disclosure differs from the bearing cages according to the first to third embodiments in that the bearing cage according to the fourth embodiment further comprise a third reservoir 30 and/or a fourth reservoir 40, and the configuration of the pillar 3 of the bearing cage according to the fourth embodiment is different from those of the first to third embodiments Referring to FIG. 15, the bearing cage according to the fourth embodiment of the present disclosure may further comprise the third reservoir 30. The third reservoir 30 may be provided in the pillar 3 to be spaced apart in the first direction from the first reservoir 10. The third reservoir 30 may be provided with a storage space (a third storage space 31) as a space for storing lubricant. The third storage space 31 may be formed to be recessed in the radially outward direction from the inner surface 3a or may be formed to be surrounded by first wall portions 33 and second wall portion 35. The second wall portion 35 may also comprise a inclined surface 33a formed to extend from the bottom surface of the third storage space 31 and configured to be moved in the radially inward direction as it goes in the first direction. The inclined surface 33a may perform a function similar to the inclined surface 16 shown in FIG. Further, the third reservoir 30 may comprise a third displacement space 39 in which the third reservoir 30 can be elastically displaced in the radially outward direction. The third displacement space 39 may perform a function similar to the first displacement space 19 shown in FIG. 5. The third reservoir 30 has a substantially same configuration with the first reservoir and thus detailed descriptions thereof will be omitted.

Since the bearing cage according to the fourth embodiment of the present disclosure further comprises the third reservoir 30, in a case in which the bearing is coupled to the mechanical device such that the axial direction of the bearing is horizontal to the ground, when the operation of the mechanical device is stopped, the lubricant may be stored in the third storage space 31 located below the shaft. Further, even if the operation of the mechanical device is resumed after the mechanical device is left in a non-use state for a long time, the mechanical device can be operated in a state where a sufficient amount of lubricant is supplied to the roller.

Further, the bearing cage according to the fourth embodiment of the present disclosure may further comprise a fourth reservoir 40 provided with a storage space (a fourth storage space 41). The fourth storage space 41 may be formed to be recessed in the radially outward direction on a surface, which faces the center of the first ring 1, out of surfaces of the first ring 1. In addition, the fourth reservoir 40 may comprise a inclined surface 43 formed to extend from the bottom surface of the fourth storage space 41 and configured to gradually increase a thickness in the radially inward direction as it goes in the first direction. That is, the inclined surface 43 is an inclined surface configured to be moved in the radially inward direction as it goes in the first direction. Lubricant may also be stored in the fourth storage space 41. Further, the inclined surface 43 may be pressed when the mold is separated from the bearing cage.

In addition, the pillar 3 of the bearing cage according to the fourth embodiment of the present disclosure may comprise a pair of chamfered portions 50. The chamfered portions 50 may be provided on both sides of the inner surface 3a of the pillar 3 in the circumferential direction, and may face the roller accommodated in the pocket 4. Hereinafter, the chamfered portions 50 will be explained with reference to the bearing cage according to the fourth embodiment. However, the chamfered portions 50 may be provided similarly even in the bearing cages according to the first to third embodiments.

The chamfered portion 50 may comprise a contact portion 51 and a non-contact portion 53. The contact portion 51 refers to a portion which is formed to protrude toward the roller to be in direct contact with the roller, and the non-contact portion 53 refers to a portion which is formed to be recessed more inward than the contact portion 51 and is not in contact with the roller. Since the chamfered portion 50 has the non-contact portion 53 which is not in contact with the roller, it is possible to reduce the frictional force generated between the roller and the chamfered portion 50.

In this case, the contact portion 51 may be arranged close to the second ring 2, and the non-contact portion 53 may be arranged close to the first ring 1. Further, a guide surface may be formed as a step portion between the contact portion 51 and the non-contact portion 53 at a boundary between the contact portion 51 and the non-contact portion 53.

Further, in a case where the roller is accommodated in the pocket 4 shown in FIG. 15, a space defined by the non-contact portion 53, the guide surface and the roller may function as a passage through which the lubricant accommodated in each storage space moves. That is, since the chamfered portion 50 has the contact portion 51 and the non-contact portion 53, even if the bearing cage has a complicated structure comprising the first reservoir 10, the second reservoir 20 and the third reservoir 30, the lubricant stored in the first storage space 11, the second storage space 21 and the third storage space 31 may smoothly flow out to the space defined by the non-contact portion 53, the guide surface and the roller. Thus, even in the case in which a large amount of lubricant is accommodated in each reservoir, the lubricant can be smoothly discharged to the outside, which makes it possible to prevent agitate resistance from being increased during the drive of the bearing.

Further, the guide surface may be formed to be inclined from the second ring 2 toward the first ring 1 as it goes in the radially outward direction. Thus, the guide surface can guide the supply path of the lubricant to be supplied to the roller. That is, it is possible to guide the lubricant in a desired direction by adjusting the inclination angle of the guide surface.

Although the above embodiments of the present disclosure are exemplified for the purpose of describing the technical spirit of the present disclosure, it should be noted that various modification and variations can be devised by those skilled in the art to which the present disclosure pertains without departing from the technical spirit and scope of the present disclosure. Accordingly, the embodiments described herein are merely examples for describing the technical sprit of the present disclosure, and the technical sprit of the present disclosure is not limited to the embodiments. Further, the scope of the present disclosure should be construed within the appended claims, and all technical ideas falling within the equivalent scope thereof should be interpreted as being included in the scope of the disclosure.

What is claimed is:

1. A bearing cage, comprising:
    a first circular ring;
    a second circular ring provided to be spaced apart from the first ring in a coaxial relationship with the first ring;
    a plurality of pillars provided in a circumferential direction of the first ring and the second ring, one end of the pillar being connected to the first ring and the other end of the pillar being connected to the second ring;
    a plurality of pockets provided in the circumferential direction and configured to provide a space in which a bearing roller is accommodated, the pocket being formed to be surrounded by the first ring, the pillars and the second ring;
    first reservoirs provided in the pillars and comprising a first storage space for storing lubricant;
    second reservoirs formed to extend in a radially inward direction from the pillars and having a second storage space formed to be opened in a radially outward direction to store the lubricant.

2. The bearing cage of claim 1, wherein the first storage space is provided on an inner surface of the pillar, which faces inward of the first ring or the second ring, and is configured to be formed to be open in a radially inward direction.

3. The bearing cage of claim 2, wherein the first storage space is formed to be recessed in a radially outward direction from the inner surface.

4. The bearing cage of claim 2, wherein the first reservoir further comprises:
   a pair of first wall portions formed to extend in the radially inward direction from the inner surface and provided to be spaced apart from each other along the circumferential direction; and
   a second wall portion formed to extend in the radially inward direction from the inner surface and configured to connect the pair of first wall portions of the first reservoir to each other,
   wherein the first storage space is formed to be surrounded by the pair of first wall portions of the first reservoir and the second wall portion of the first reservoir.

5. The bearing cage of claim 4, wherein
   a diameter of the second ring is smaller than that of the first ring,
   the pillar is formed to be inclined in the radially outward direction as it goes in a first direction extending from the second ring toward the first ring, and
   the second wall portion of the first reservoir is provided to connect first ends of the first wall portions of the first reservoir to each other.

6. The bearing cage of claim 5, wherein the first wall portion of the first reservoirs comprises an inclined surface formed to extend from a position spaced apart from the second wall portion of the first reservoir by a certain distance in a direction opposite to the first direction and configured such that a thickness in the radially inward direction is increased as it goes in the first direction, and the inclined surface is inclined relative to the pillar.

7. The bearing cage of claim 5, wherein the second wall portion of the first reservoir comprises a inclined surface formed to extend from a bottom surface of the first storage space and configured such that a thickness in the radially inward direction is increased as it goes in the first direction.

8. The bearing cage of claim 5, further comprising: a first displacement to form a space in which the first reservoir is elastically displaced,
   wherein the first displacement space is formed between the second wall portion of the first reservoir and the inner surface of the pillar.

9. The bearing cage of claim 1, wherein the second reservoir comprises:
   a pair of first wall portions formed to extend in the radially inward direction from an inner surface of the pillar, which faces inward of the first ring or the second ring, and provided to be spaced apart with each other in the circumferential direction;
   a second wall portion provided to connect radially inner ends of the pair of first wall portions of the second reservoir to each other; and
   a third wall portion formed to extend in the radially outward direction from an end of the second wall portion of the second reservoir in a direction opposite to a first direction extending from the second ring toward the first ring so as to block at least a portion of an opening formed between the first wall portions of the second reservoir,
   wherein the second storage space is formed to be surrounded by the pair of first wall portions of the second reservoir, the second wall portion of the second reservoir and the third wall portion of the second reservoir.

10. The bearing cage of claim 9, wherein the second reservoir further comprises a fourth wall portion formed to extend in the radially outward direction from another end of the second wall portion of the second reservoir, so as to block at least a portion of an opening formed between the first wall portions of the second reservoir,
    wherein the second storage space is further surrounded by the fourth wall portion of the second reservoir.

11. The bearing cage of claim 10, wherein the fourth wall portion of the second reservoir comprises an inclined surface formed to extend in the first direction from a bottom surface of the second storage space and configured to increase a thickness of the fourth wall portion.

12. The bearing cage of claim 9, wherein the pair of first wall portions of the second reservoir are provided to extend in the radially inward direction from the inner surface such that the second wall portion of the second reservoir protrudes more radially inwardly than the roller when the roller is accommodated in a radially outer most position within the pocket.

13. The bearing cage of claim 12, wherein the first ring and the second ring are configured to be elastically deformed in the radially outward direction,
    a diameter of the second ring is smaller than that of the first ring, and
    when an inner ring for a bearing is assembled into the first ring and the second ring in a direction extending from the first ring toward the second ring after the rollers are accommodated in the pillars, the inner ring presses the second wall portion of the second reservoir without coming into contact with the roller to elastically deform at least the second wall portion of the second reservoir in the radially outward direction.

14. The bearing cage of claim 13, wherein the second wall portion of the second reservoir is provided to be inclined in the radially outward direction along a direction extending from the second ring toward the first ring.

15. The bearing cage of claim 1, further comprising: third reservoirs provided in the pillars to be spaced apart from the first reservoir in a direction extending from the second ring toward the first ring, and having a third storage space for storing the lubricant.

16. The bearing cage of claim 1, wherein the pillar comprises chamfered portions provided on circumferential sides of the inner surface of the pillar, which faces inward of the first ring or the second ring, and provided to face the roller, and
    wherein the chamfered portions include a contact portion formed to protrude toward the roller and contact the roller; and a non-contact portion which is not in contact with the roller.

17. A bearing cage, comprising:
    a first circular ring;
    a second circular ring provided to be spaced apart from the first ring in a coaxial relationship with the first ring;
    a plurality of pillars provided in a circumferential direction of the first ring and the second ring, one end of the pillar being connected to the first ring and the other end of the pillar being connected to the second ring;
    a plurality of pockets provided in the circumferential direction and configured to provide a space in which a bearing roller is accommodated, the pocket being formed to be surrounded by the first ring, the plurality of pillars and the second ring; and
    reservoirs formed to extend in a radially inward direction from the pillars and having a second storage space to be opened in a radially outward direction to store lubricant.

18. The bearing cage of claim 17, wherein the reservoir is provided to protrude in the radially inward direction from an inner surface of the pillar, which is radially inward of the first ring or the second ring, and wherein the storage space is formed to be surrounded by: a pair of first wall portions formed to extend in the radially inward direction from the inner surface and provided to be spaced apart with each other in the circumferential direction; a second wall portion configured to connect radially inner ends of the first wall portions; and a third wall portion formed to extend in the radially outward direction from an end of the second wall portion in a direction opposite to a first direction, which extends from the second ring toward the first ring, so as to block at least a portion of an opening formed between the first wall portions.

\* \* \* \* \*